United States Patent
Bliss et al.

(10) Patent No.: US 8,358,716 B2
(45) Date of Patent: Jan. 22, 2013

(54) METHOD AND APPARATUS FOR SYNCHRONIZING A WIRELESS COMMUNICATION SYSTEM

(75) Inventors: Daniel W. Bliss, Cambridge, MA (US); Peter A. Parker, Billerica, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 752 days.

(21) Appl. No.: 12/381,076

(22) Filed: Mar. 6, 2009

(65) Prior Publication Data
US 2010/0226454 A1 Sep. 9, 2010

(51) Int. Cl.
H04B 7/02 (2006.01)
(52) U.S. Cl. ........ 375/267; 375/146; 375/147; 375/260; 375/295; 375/296; 375/316; 375/340; 375/346; 375/347
(58) Field of Classification Search .............. 375/267, 375/354, 146, 147, 260, 295, 296, 340, 343, 375/346; 370/203, 204, 205, 208, 209, 210
See application file for complete search history.

(56) References Cited

U.S. PATENT DOCUMENTS

| | | | | |
|---|---|---|---|---|
| 5,546,087 | A * | 8/1996 | Martin Neira | 342/120 |
| 6,038,497 | A * | 3/2000 | Nelson, Jr. | 701/3 |
| 7,088,782 | B2 | 8/2006 | Mody et al. | |
| 7,482,862 | B2 * | 1/2009 | Aouine et al. | 329/300 |
| 7,869,551 | B2 * | 1/2011 | Krishnan et al. | 375/354 |
| 8,019,285 | B2 * | 9/2011 | Nakamura | 455/63.4 |
| 2004/0105506 | A1 | 6/2004 | Baek et al. | |
| 2006/0239370 | A1 | 10/2006 | Mody et al. | |
| 2007/0217386 | A1 | 9/2007 | Visoz et al. | |
| 2008/0031309 | A1 | 2/2008 | Chang et al. | |
| 2009/0141775 | A1 * | 6/2009 | Kober et al. | 375/148 |
| 2010/0098042 | A1 * | 4/2010 | Dent | 370/342 |

FOREIGN PATENT DOCUMENTS
WO WO 2009/018655 A1 2/2009

OTHER PUBLICATIONS

Padam Kafle, "Spatial correlation and capacity measurements for Wideband MIMO channels in Indoor office envivornment" IEEE trascations on wireless communications, vol. 7 No. 5, May 2008.*
Bliss, D.W., et al., "Environmental issues for MIMO capacity," *IEEE Transactions on Signal Processing*, vol. 50, No. 9, pp. 2128-2142, Sep. 2002.

(Continued)

Primary Examiner — Dhaval Patel
(74) Attorney, Agent, or Firm — Hamilton, Brook, Smith & Reynolds, P.C.

(57) ABSTRACT

Techniques for synchronizing a receiver and transmitter in a wireless communication system address synchronization within the context of a detection formulation and provide synchronization statistics used to declare a synchronization detection. A signal is received from a channel at multiple receiving antennas. The receiver and transmitter are synchronized based on the received signal and a channel model incorporating the multiple receiving antennas. The channel model may also incorporate a resolvable delay spread of the received signal with respect to each receiving antenna. Synchronization may be based on a known component of a received signal and further on a channel model incorporating multiple receiving antennas and an interference signal. The known component may be a cyclic prefix or a pilot sequence as in orthogonal frequency division multiplexing (OFDM).

26 Claims, 6 Drawing Sheets

OTHER PUBLICATIONS

Edelman, A., et al., "The geometry of algorithms with orthogonality constraints," *SIAM Journal on Matrix Analysis and Applications*, vol. 20, No. 2, pp. 303-353, 1999.

Forsythe, K.W., "Performance of space-time codes over a flat-fading channel using a subspace-invarient detector," *Conference Record of the Thirty-Sixth Asilomar Conference on Signals, Systems and Computers*, vol. 1, Nov. 2002.

Foschini, G.J., "Layered space-time architecture for wireless communication in a fading environment when using multi-element antennas," *Bell Labs Technical Journal*, vol. 1, No. 2, pp. 41-59, Autumn 1996.

Ma, Z., et al., "An ICI-free synchronization algorithm in MIMO OFDM system," *Wireless Pervasive Computing, 2007. ISWPC'07. 2nd International Symposium on*, Feb. 2007.

Mhiri, R., et al., "Synchronization for a DVG-T receiver in presence of co-channel interference," in *Proc. IEEE PIMRC 2002*, Lisbon Portugal, pp. 2307-2311 Sep. 2002.

Mody, A.N., et al., "Synchronization for MIMO OFDM systems," *Global Telecommunications Conferences, 2001. Globecom 01. IEEE*, vol. 1, pp. 509-513, 2001.

Schmidl, T.M., et al., "Robust frequency and timing synchronization for OFDM," *IEEE Transactions on Communications*, vol. 45, No. 12, pp. 1613-1621, Dec. 1997.

Telatar, I.E., "Capacity of multi-antenna Gaussian channels," *European Transactions on Telecommunications*, vol. 10, No. 6, pp. 585-595, Nov.-Dec. 1999.

Tufvesson, F., et al. "Time and frequency synchronization for OFDM using PN-sequence preambles," *Vehicular Technology Conference, 1999 VTC 1999-Fall. IEEE VTS 50th*, vol. 4, pp. 2203-2207, 1999.

van de Beek, J.J., et al., "ML estimation of time and frequency offset in OFDM systems," *IEEE Transactions on Signal Processing*, vol. 45, No. 7, pp. 1800-1805, Jul. 1997.

Wang, D., et al., "Timing synchronization for MIMO OFDM WLAN systems," *Wireless Communications and Networking Conference, 2007, WCNC 2007, IEEE*, pp. 1177-1182, Mar. 2007.

Zhou, E., et al., "Synchronization algorithms for MIMO OFDM systems," *Wireless Communications and Networking conferences, 2005 IEEE*, pp. 18-22, vol. 1, Mar. 2005.

Notification of Transmittal of the International Search Report and the Written Opinion of the International Searching Authority, or the Declaration for PCT/US2010/023883, Date mailed: May 19, 2011 (22 pages).

Invitation to Pay Additional Fees and, Where Applicable, Protest Fee mailed Feb. 14, 2011 for International Application No. PCT/US2010/023883.

Williams, Chris, et al., "Exploiting Multiple Antennas for Synchronization," *IEEE Transactions on Vehicular Technology*, vol. 58, No. 2, pp. 773-787 (Feb. 1, 2009).

Bliss, D.W., et al., "Synchronization of MIMO Wireless Communication in the Presence of Interference", 23 pages (presented Jun. 7, 2006).

\* cited by examiner

METHOD AND APPARATUS FOR SYNCHRONIZING A WIRELESS COMMUNICATION SYSTEM

GOVERNMENT SUPPORT

This invention was made with government support under Contract No. FA8721-05-C-0002, awarded by the US Air Force. The government has certain rights in this invention.

RELATED APPLICATIONS

This application claims the benefit of U.S. Provisional Application filed on Feb. 18, 2009, by Daniel W. Bliss and Peter A. Parker, entitled "Method and Apparatus for Synchronizing a Wireless Communication System,". The entire teachings of the above application are incorporated herein by reference.

BACKGROUND OF THE INVENTION

Wireless communication is becoming ubiquitous. As usage of finite spectral allocation increases, co-channel interference is becoming a significant issue. One of the most fragile components of communications is synchronization, i.e., the detection and timing estimation of an incoming (received) signal. With the introduction of the wireless WiFi standard IEEE 802.11N, multiple antenna wireless systems have become more common. However, the presence of interference has presented a significant obstacle to conventional wireless technologies utilizing multiple antennas. Making the problem more difficult is the complicated multipath environment, characterized by resolvable delay spread of signals, in which wireless systems typically operate.

SUMMARY OF THE INVENTION

Methods, or corresponding apparatuses, of synchronization between a receiver and a transmitter in the presence of interference or multipath returns for multiple antenna wireless communication systems are provided, each by processing a signal in a signal receiver of a wireless communication system. A signal is received from a channel at multiple receiving antennas. The signal receiver is synchronized to a signal transmitter based on the received signal and a channel model incorporating the multiple receiving antennas.

In certain embodiments, the model also incorporates a resolvable delay spread of the received signal with respect to each receiving antenna.

The channel model may also incorporate an interference signal. The interference signal in the channel model may include its own resolvable delay spread. The channel model may incorporate multiple transmitting antennas that transmit respective signals, with or without incorporating interference, to support multiple input multiple output (MIMO) communications Synchronizing the receiver and transmitter may make use of a synchronization statistic that is determined based on the received signal and the channel model. The synchronization statistic may be compared to a threshold.

The synchronization statistic may minimize an error between a function of the received signal and the transmitted signal. The synchronization statistic may be invariant to spatial and temporal transformations.

The synchronization statistic may be based on a distance measure between two subspaces of a reference signal. In respective embodiments, the distance measure corresponds to an arc length, a minimum angle, a chord length, and a product of sine functions evaluated at respective principal angles between the subspaces.

The synchronization statistic may be based on a generalized likelihood ratio comparing two likelihoods that are conditioned on synchronization and nonsynchronization hypotheses, respectively.

The synchronization statistic may be determined periodically to provide a coarse synchronization. A fine synchronization may follow the coarse synchronization. The coarse and fine synchronizations may each use a generalized likelihood ratio test (GLRT), each GLRT comparing two likelihoods that are conditioned on respective synchronization and nonsynchronization hypotheses.

The method of processing a signal in a signal receiver of a wireless communication system may be performed successively until a synchronization is achieved. Synchronizing may provide temporal and/or frequency synchronization between the signal receiver and the signal transmitter. In certain embodiments, synchronization is performed in frequency domain.

The method may further include demodulating the received signal.

Synchronizing the signal receiver to the signal transmitter may further be based on a known component of the received signal.

In the same or other embodiments, a signal is received from a channel at multiple receiving antennas, and the signal receiver is synchronized to a signal transmitter based on a known component of the received signal and further based on a channel model incorporating the multiple receiving antennas and an interference signal including a resolvable delay spread. The known component may, for example, be a cyclic prefix or a pilot sequence.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

For wireless communication systems, temporal synchronization can be the weakest component of a link. This potential weakness is exacerbated when an attempt is made to establish a link in the presence of interference. Embodiments of the present invention include techniques for synchronization, e.g., temporal synchronization, of multiple-input multiple-output (MIMO) communication links. In the context of MIMO, the term "multiple inputs" refers to multiple transmitting antennas that transmit respective signals, e.g., to achieve spatial diversity. The term "multiple outputs" refers to multiple receiving antennas to receive respective signals from the transmitting antennas over a wireless channel. The term "MIMO" is used herein, although embodiments of the invention pertain to single input, multiple output (SIMO) systems as well, since SIMO is a degenerate case of MIMO.

MIMO communication provides a number of potential performance benefits compared to traditional single-antenna links. With the wide acceptance of IEEE 802.11N, MIMO communication is becoming the standard local-area wireless approach. Furthermore, given the limited spectrum of the industrial, scientific and medical (ISM) bands, interference is becoming a significant issue for the typical user.

Synchronization has traditionally been viewed as a continuous parameter estimation problem. In practice, most digital communication systems only achieve synchronization to within some discrete resolution determined by the sampling rate. Furthermore, when a channel has delay spread caused by multipath scattering, which is common in non-line-of-sight ground-to-ground communication links, there may not be any single, well-defined delay that defines synchronization. If the alignment is found to be within some window, e.g., within a sample, then successful synchronization can traditionally be obtained. Embodiments of the present invention address the synchronization problem within the context of a detection formulation.

Figure 1:
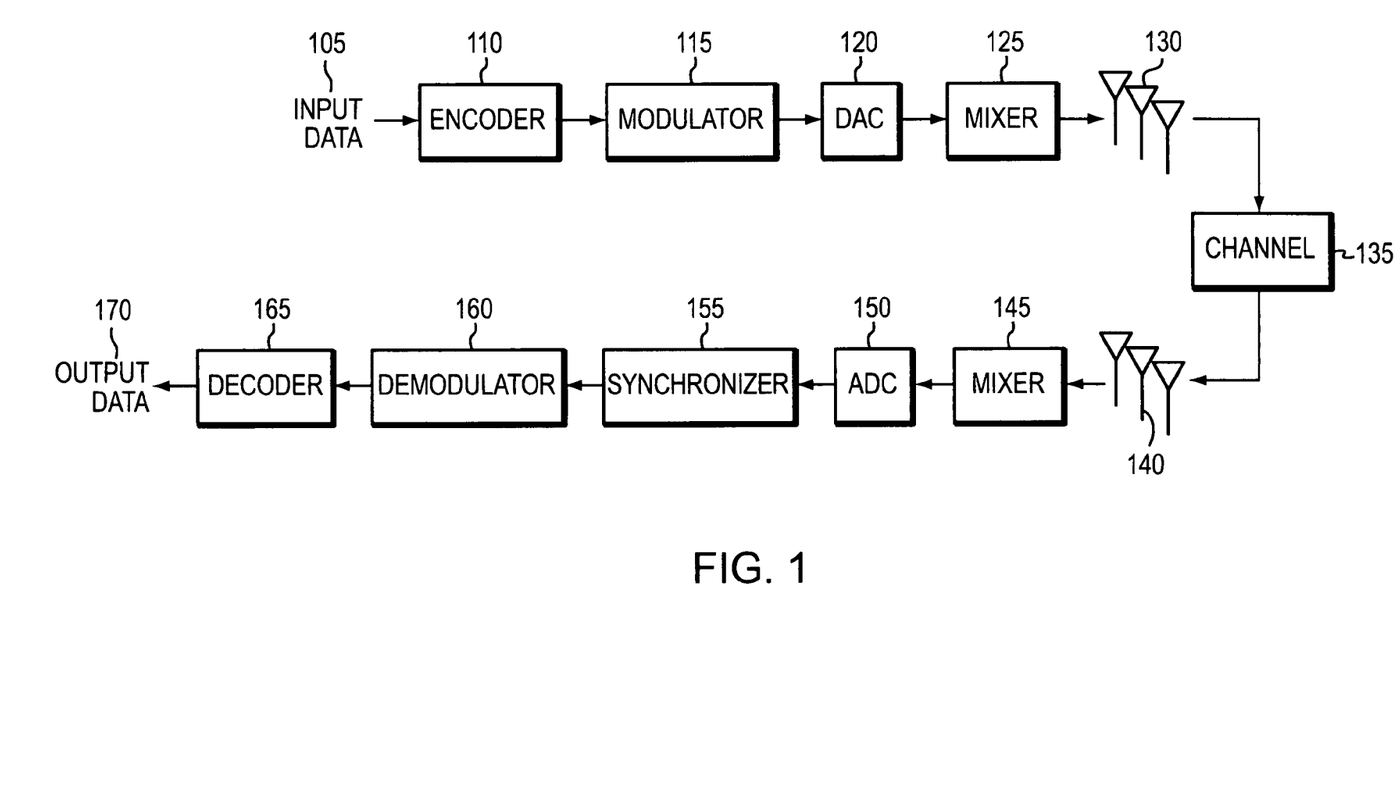
FIG. 1 is a block diagram of a wireless communications system according to the prior art and certain embodiments of the invention.

FIG. 1 is a block diagram of a wireless communications system. Input data 105, e.g. input bits, are encoded by an encoder 110 for efficiency and reliability. The encoded signal is passed to a modulator 115. The modulator 115 may, for example, map bits into symbols by specifying the magnitude and phase of a voltage signal. The modulator 115 may also, for example, perform an inverse Fourier transform, e.g., via an Inverse Fast Fourier Transform (IFFT), or perform single-frequency modulation, e.g., via binary phase shift keying (BPSK). After conversion to an analog signal at a digital-to-analog converter (DAC) 120, the modulated signal is moved to a carrier frequency by a mixer 125 for transmission by one or more transmitting antennas 130. The signal traverses a channel 135 and is received by one or more receiving antennas 140. After conversion to baseband at a mixer 145 and sampling at an analog-to-digital converter (ADC) 150, the signal may be passed to a synchronizer 155.

Synchronization between the signal transmitter and the signal receiver ensures that received data will be interpreted correctly and that the output bits will match the input bits. In this context, the term "transmitter" may refer to one or more of the processing blocks prior to the channel. For example, the transmitter may be construed to be the transmitting antenna 130 or all of the processing blocks from the encoder 110 to the transmitting antenna 130. Similarly, the term "receiver" may refer to one or more of the processing blocks following the channel. As used herein, synchronization refers to a process performed in a signal receiver (for example, at the synchronizer 155) as part of a method of processing a signal. One of ordinary skill in the art appreciates that a receiver receives a signal, e.g., over a channel, and processes the signal in some way.

As shown in FIG. 1, the synchronizer 155 precedes a demodulator 160 in the processing chain; however, in another embodiment (not shown), the positions of the synchronizer 155 and the demodulator 160 are interchanged. The demodulator 160 interprets symbols (e.g., phase and magnitude) and passes interpreted bits to decoder 165, which yields output data 170, e.g., output bits, which should match the input data 105.

Figure 2:
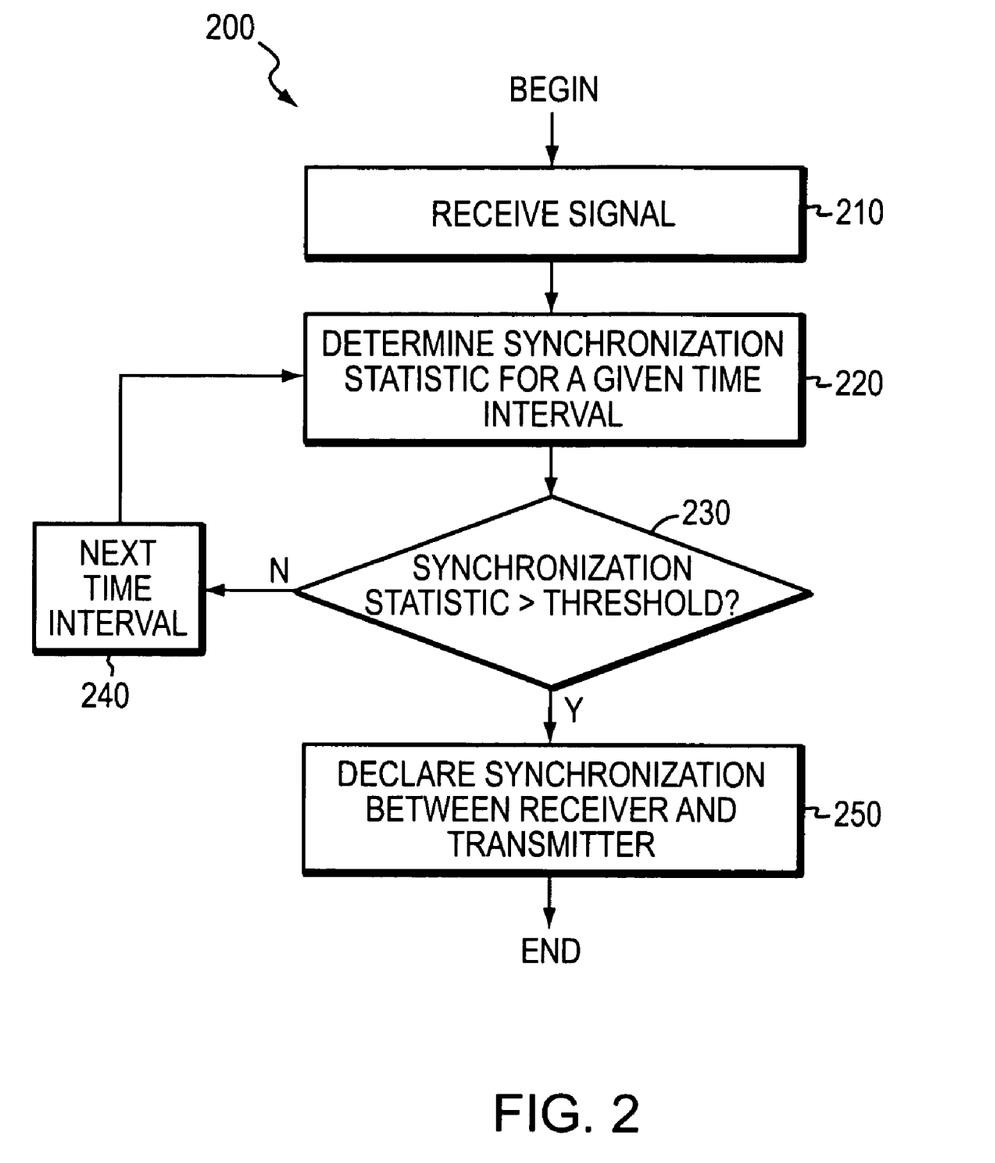
FIG. 2 is a flow diagram according to an embodiment of the invention.

FIG. 2 is a flow diagram according to one embodiment of the invention. FIG. 2 shows a process performed at the synchronizer 155 of the signal receiver. A signal is received (210), e.g., over a channel at multiple receiving antennas (210). A synchronization statistic corresponding to a given time interval is determined (220). The synchronization statistic may be determined based on time-domain or frequency-domain processing of the signal. If the calculated statistic exceeds a defined threshold (230), a synchronization is declared between the receiver and the transmitter (250). The threshold may be a predetermined threshold, an adaptive threshold, or any type of threshold appropriate for a detection framework in a particular implementation. The synchronization may be a temporal synchronization, i.e., aligning the receiver and the transmitter in time. If the synchronization statistic does not exceed the threshold, the time interval is advanced (240), and the synchronization statistic is determined anew.

Given some observed data as a function of time $z(t)$ and assuming some set of known (reference) transmitted signals $s(t)$, the continuous synchronization statistic is denoted $\phi(\tau)$. All of the statistics considered here can be described by some time-integrated function $$\phi(\tau) = \int_T dt f(z(t-\tau), s(t)),$$

where $f(z, s)$ is some arbitrary function, and $t$ is taken over some interval, $T$. For some local peak of the statistic, a detection is declared if the statistic exceeds a defined threshold, $\phi_{thresh}$, $$\phi(\tau_{peak}) \overset{>}{<} \phi_{thresh}.$$

For a given operating environment, each statistic operates along a curve in the space of probability of detection versus probability of false alarm. The value of the threshold determines the operating point on that curve.

Figure 3:
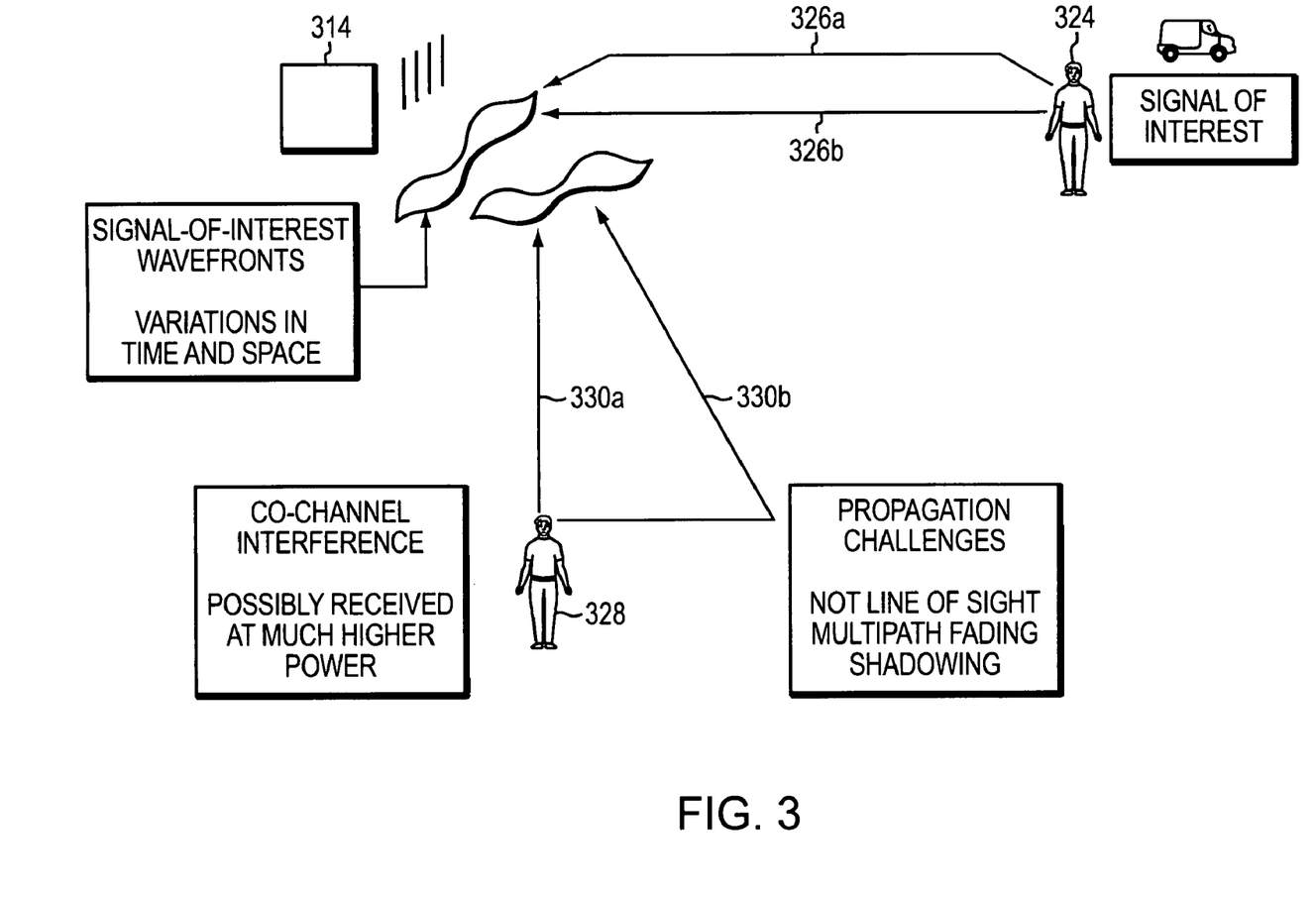
FIG. 3 shows wireless signal propagation, including interference and multipath.

FIG. 3 shows wireless signal propagation, including interference and multipath. A transmitter 328 transmits a signal to a receiver 14. Factors such as land topography, buildings, antenna location, and others affect the transmission of the wireless signal through reflection and refraction. Accordingly, the wireless signal travels via multiple paths 326a, 326b to the receiver 314. As the same wireless signal 326a, 326b travels via multiple paths to the receiver 314, one or more delayed signals are received at the receiver 314 (the "multipath" effect). Wideband (as opposed to narrowband) processing is associated with processing of signals having a resolvable delay spread, e.g., characterized by received signals having different delays that can be distinctly resolved.

Also shown in FIG. 3, an interfering user 328 sends interfering signals (interference) 330a, 330b to the receiver 314. Variations in power between the user of interest and the interfering user can cause the signal of interest to be masked.

Narrowband Statistics

For any practical digital system, the signals are sampled. If the bandwidth of the signal is sufficiently small such that channel multipath delays are not resolved, then the received signal can be modeled by using the following narrowband MIMO relationship, assuming $n_t$ transmit antennas, $n_r$ receive antennas, and $n_s$ samples:

$$Z = HS + N,$$

where $Z \in \mathbb{C}^{n_r \times n_s}$ is the received data matrix, $H \in \mathbb{C}^{n_r \times n_t}$ is the narrowband channel matrix, $S \in \mathbb{C}^{n_t \times n_s}$ is the transmitted signal matrix, and $N \in \mathbb{C}^{n_r \times n_s}$ is the noise-plus-interference matrix. The transmitted signals and received signals at some delay $\tau$ are defined by $$S = (s(T_s), s(2T_s), \ldots, s(n_s T_s))$$

$$Z_\tau = (z(T_s - \tau), z(2T_s - \tau), \ldots, z(n_s T_s - \tau)),$$

where $T_s$ is the sample period.

Synchronization in Wideband Interference and Channels

Time-domain synchronization techniques for wideband interference and channels are provided in embodiments of the invention. To aid this discussion, the wideband received signal with $n_d$ delays is denoted by $\tilde{Z} \vdash \mathbb{C}^{(n_d n_r) \times n_s}$, and the wideband transmit signal with $n_\delta$ delays is denoted by $\tilde{S} \in \mathbb{C}^{(n_\delta n_t) \times n_s}$. The delays are included in the data matrix by introducing shifted versions of the data stream, $$\tilde{Z}_\tau^T \equiv (Z_{t_1+\tau}^T, Z_{t_2+\tau}^T, \ldots, Z_{t_{nd}+\tau}^T).$$

Similarly, the resolvable delay spread of transmitted signals is captured by $$\tilde{S}^T \equiv (S_{t_1}^T, S_{t_2}^T, \ldots, S_{t_{nq\delta}}^T).$$

Wideband: Time Domain MMSE

1) Narrowband Channel: Assuming wideband interference and a narrowband signal-of-interest channel, a statistic can be constructed. A space-time beamformer is constructed:

$$\hat{W} = (\tilde{Z}_\tau \tilde{Z}_\tau^\dagger)^{-1} \tilde{Z}_\tau S^\dagger$$

$$Y = \hat{W}^\dagger \tilde{Z}_\tau$$

$$= S P_{\tilde{Z}_\tau}$$

where $P_{\tilde{Z}_\tau} \equiv \tilde{Z}_\tau^\dagger (\tilde{Z}_\tau \tilde{Z}_\tau^\dagger)^{-1} \tilde{Z}_\tau$ is the operator that projects onto the row space spanned by $\tilde{Z}_\tau$.

$$\|Y\|_F^2 = tr\{S P_{\tilde{Z}_\tau} S^\dagger\}.$$

For convenience, in one embodiment, the statistic can be normalized by the reference, bounding the output between [0,1]:

$$\varphi(\tau) = \frac{\|Y\|_F^2}{\|S\|_F^2}$$

$$= \frac{tr\{S P_{\tilde{Z}_\tau} S^\dagger\}}{tr\{S S^\dagger\}}.$$

2) Wideband Channel: If the channel from the transmitter to the receiver is frequency selective because of delay spread, then the energy of the signal may be distributed in time to the extent that synchronization is difficult when assuming a narrowband channel. A wideband version of the statistic can be constructed by allowing for delay spread in the reference signal. The value of hd δ only needs to be large enough to capture a reasonable fraction of the energy. It is not required to capture the entire delay spread. The space-time beamformer is given by $$\tilde{W} = (\tilde{Z}_\tau \tilde{Z}_\tau^\dagger)^{-1} \tilde{Z}_\tau \tilde{S}^\dagger$$

$$\tilde{Y} = \tilde{W}^\dagger \tilde{Z}_\tau = \tilde{S} P_{\tilde{Z}_\tau}$$

$$\|\tilde{Y}\|_F^2 = tr\{\tilde{S} P_{\tilde{Z}_\tau} \tilde{S}^\dagger\}.$$

Although normalization is not required for this statistic or any other, for convenience, the statistic can be normalized by the reference bounding the output between [0,1]:

$$\varphi_{wb,mmse}(\tau) = \frac{\|\tilde{Y}\|_F^2}{\|\tilde{S}\|_F^2} = \frac{tr\{\tilde{S} P_{\tilde{Z}_\tau} \tilde{S}^\dagger\}}{tr\{\tilde{S} \tilde{S}^\dagger\}}.$$

This statistic has the advantage of collecting more energy. However, the peak of the statistic is smoothed temporally. This is well matched to the wideband channel because if there is delay spread in the channel, then the notion of temporal synchronization is not precise.

Wideband: Space-Time Invariant Statistics

An embodiment of the invention provides synchronization statistics that are invariant to spatial transformations. As an example of a spatially invariant narrowband statistic, under the transformations $Z_\tau \rightarrow A Z_\tau$ and $S \rightarrow B S$ for some arbitrary nonsingular square matrices A and B, the statistic is unchanged:

$$\phi(A Z_\tau, B S) = \phi(Z_\tau, S).$$

The statistic is a function of the row space of $Z_\tau$ and $S$ only. Wideband extensions to spatially invariant statistics can be constructed by employing the definitions of $\tilde{S}$ and $\tilde{Z}$. By using this approach, synchronization statistics are constructed that are explicitly blind to some number of delays, i.e., temporally invariant. However, because it is assumed that the channel has delay spread, and no one delay can be said to precisely define synchronization, this approach is valid.

The row spaces of $\tilde{Z}_\tau$ and $\tilde{S}$ can be represented by the matrices $\tilde{Y}$ and $\tilde{T}$ respectively, such that $\tilde{Y}^\dagger \tilde{Y} = P_{\tilde{Z}_\tau}$ and $\tilde{T}^\dagger \tilde{T} = P_{\tilde{S}}$.

$$\tilde{Y} \tilde{T}^\dagger = U \, diag\{\cos(a)\} V^\dagger,$$

where the vector a contains the principal angles of the product of $\tilde{Y}$ and $\tilde{T}$. Given this set of principal angles, variety of spatially invariant statistics can be constructed, since a number of possible measures of the distance between subspaces are available. The following is a subset: arc length, minimum angle, chord, or the product:

Arc Length: $\phi_{ArcLen}(\tau) = \|a\|^{-1}$
Minimum Angle: $\phi_{MinAng}(\tau) = (\min\{a\})^{-1}$
Chord Length: $\phi_{Chord}(\tau) = \|2 \sin\{a/2\}\|^{-1}$
Product: $\phi_{Prod}(\tau) = (\Pi_m \sin\{a_m\})^{-1}$ Of particular interest is the product, which can be represented by $$\phi_{wb,si}(\tau) = |I - P_{\tilde{S}} P_{\tilde{Z}_\tau}|^{-1/2}.$$

An embodiment of the invention includes a channel model incorporating multiple receiving antennas and a resolvable delay spread of a received signal with respect to each receiving antenna. The channel model includes multiple receiving antennas by virtue of the received data matrix accounting for multiple receiving antennas. The channel model includes a resolvable delay spread for the received signal with respect to each receiving antenna by virtue of the received signal accounting for multiple delays.

Certain embodiments of the invention include techniques for processing a received signal that has a known component, which may be used for synchronization purposes. The known component may refer to exactly knowing particular content of a received signal, in which case the known component is referred to as a pilot sequence. For example, a receiver may wait until the pilot sequence is observed, at which point synchronization is declared. In other scenarios, only the structure of a received signal is known.

Orthogonal frequency division multiplexing (OFDM) may make use of both types of known components. Certain embodiments of the invention exploit such known components for synchronization purposes, e.g., by providing synchronization statistics that make use of known components.

Figure 5A:
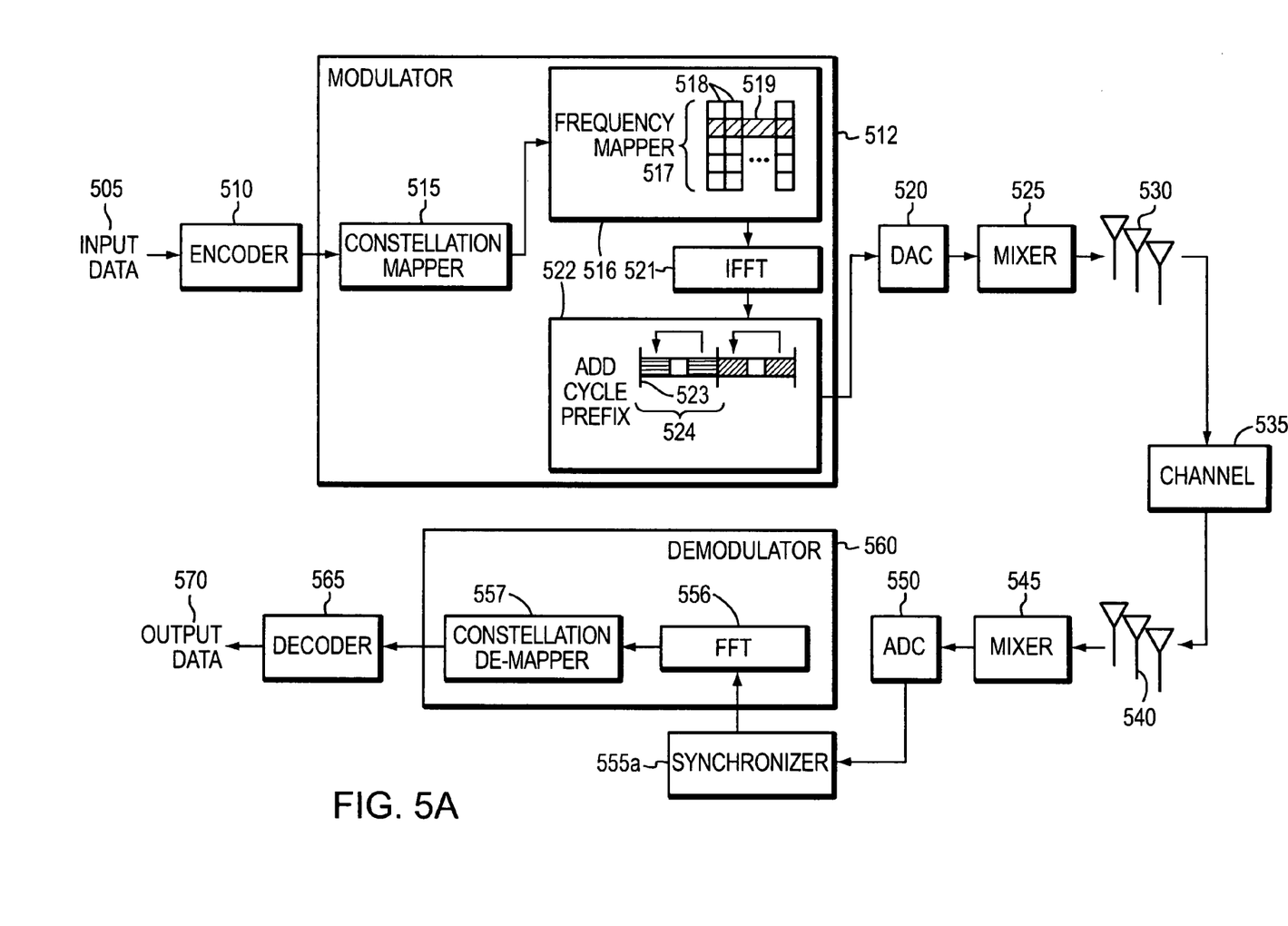
FIG. 5A is a block diagram of an embodiment of the invention that includes a received signal having a known component and a channel model incorporating multiple receiving antennas and an interference signal. The synchronizer is positioned before the Fast Fourier Transform (FFT) in this embodiment.

FIG. 5A is a block diagram corresponding to an embodiment of the invention that includes a received signal having a known component and a channel model incorporating multiple receiving antennas and an interference signal. Input bits 505 are presented to an encoder 510, and then to a modulator 512, a DAC 520, a mixer 525, and transmitting antennas 530. The modulator may include a constellation mapper 515, which maps bits into symbols in a constellation of magnitudes and phases, a frequency mapping module 516, an Inverse Fast Fourier Transform (IFFT) module 521, and a cyclic prefix insertion module 522.

In the frequency mapping, successive symbols are applied to successive frequency bins to form an OFDM symbol 518. The process is repeated with successive symbols in successive OFDM symbols. FIG. 5A shows that a pilot sequence 519 may be embedded by adding, at a particular frequency bin of the frequency bins 517, a known value within each OFDM symbol 518. In some embodiments, only some of the OFDM symbols 518 are populated with pilot sequence information.

In the IFFT module, the frequency domain OFDM symbols are transformed to the time domain. When used, the cyclic prefix insertion module 522 repeats, for each OFDM symbol 524 in the time domain, a tail end of the symbol at the head (i.e., as a cyclic prefix 523).

After traversing a channel 535, the signal is received at receiving antennas 540 and then is processed by a mixer 545 and an ADC 550. In the embodiment shown in FIG. 5A, processing proceeds from the ADC 550 to the synchronizer 555a and then to a Fourier transform (e.g., FFT) 556 and to a frequency and constellation de-mapper 557.

Figure 5B:
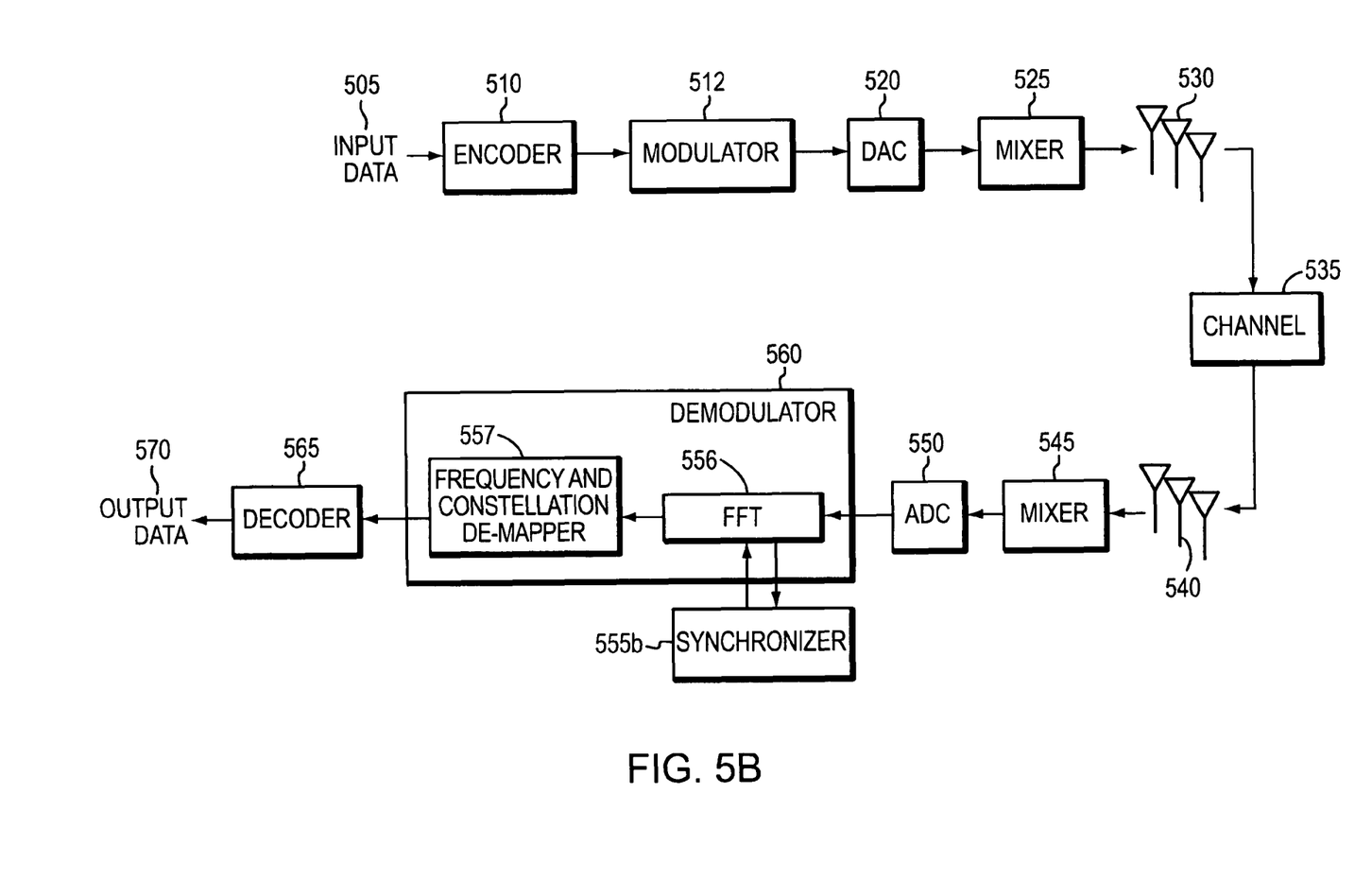
FIG. 5B is a block diagram of another embodiment of the invention in which the synchronizer is positioned after the FFT.

FIG. 5B shows another embodiment, in which processing proceeds from the ADC 550 to the FFT 556, then to synchronizer 555b, and then back to the FFT 556 and to the frequency and constellation de-mapper 557.

Figure 5C:
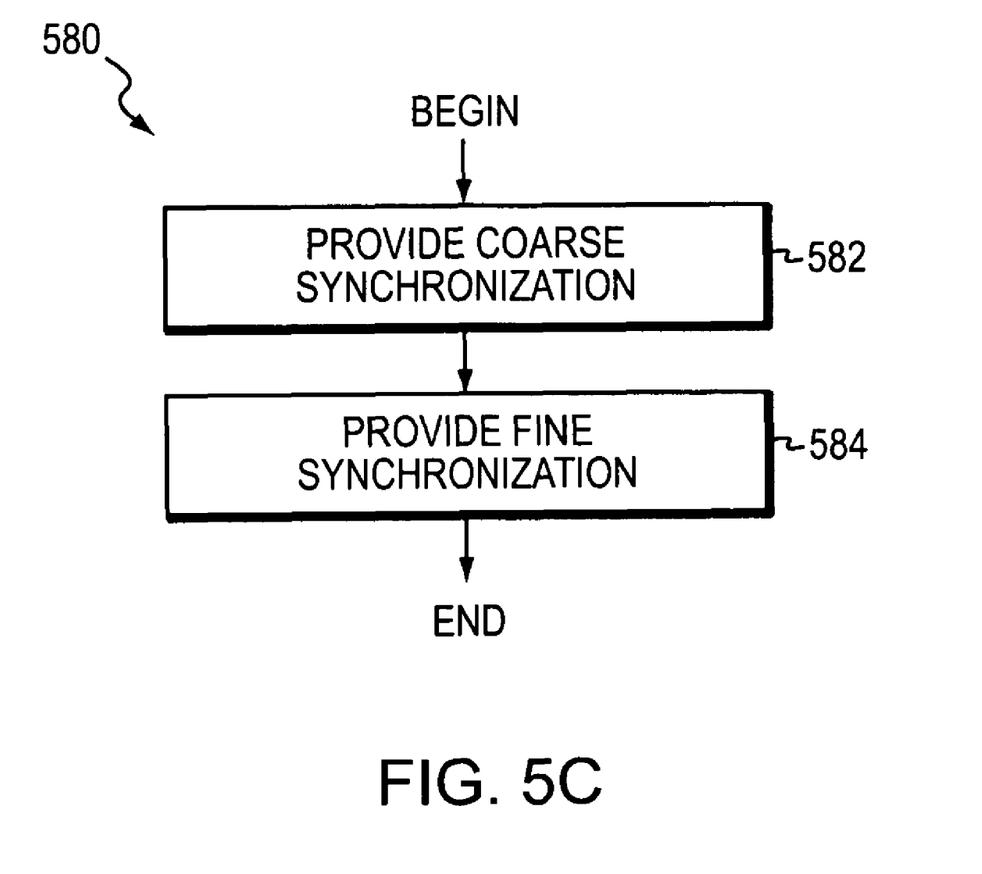
FIG. 5C is a flow diagram showing coarse and fine synchronization.

FIG. 5C is a flow diagram showing that the synchronization 580 may include a coarse synchronization 582 followed by a fine synchronization 584.

After demodulation, data is processed by a decoder 565 to yield output data 570 which should match input data 505.

OFDM Techniques

If the OFDM symbol has length $T_{ofdm}$, then the repeated portion of the symbol is separated by this delay. The length of the cyclic prefix is $n_{cyc}$. The first data block is defined $Z_1 \in \mathbb{C}^{n_r \times n_{cyc}}$ received at delay $\tau$, and the second data block is defined $Z_2 \in \mathbb{C}^{n_r \times n_{cyc}}$ received at delay $\tau + T_{ofdm}$.

Narrowband Spatially Invariant Cyclic Prefix Statistic

By using spatial invariance as a motivation, a synchronization statistic can be constructed. It is assumed that the statistic must be invariant under $Z_1 \rightarrow AZ_1$ and $Z_2 \rightarrow BZ_2$. Similar to the discussion presented above, a variety of statistics are available. An example is $$\phi_{cyc,prod} = |I - P_{Z_1} P_{Z_2}|^{-1/2}.$$

The generalized-likelihood ratio test (GLRT) is a likelihood ratio test in which the parameters of the probability density function are estimated using maximum-likelihood estimators. The ratio compares the maximum of probability density functions given two hypotheses. The first is that the synchronization signal is present, and the second is that the synchronization signal is absent or misaligned.

Narrowband Cyclic Prefix GLRT

The narrowband Cyclic Prefix GLRT formulation notes that the probability density for $Z_1$ and $Z_2$ under the assumption of synchronization is given by $$p(Z_1, Z_2 \mid X, R) = \frac{e^{-tr\{(Z_1-X)^\dagger R^{-1}(Z_1-X) + (Z_2-X)^\dagger R^{-1}(Z_2-X)\}}}{|R|^{2n_{cyc}} \pi^{2n_{cyc} n_r}},$$

where R is the noise-plus-interference covariance matrix during the two intervals, and the matrix X=HS combines the channel and the unknown transmitted sequence. The maximum-likelihood estimate for X is given by $$\hat{X} = \frac{Z_1 + Z_2}{2}.$$

Consequently, the likelihood is given by $$p(Z_1, Z_2 \mid \hat{X}, R) = \frac{e^{-\frac{1}{2}tr\{(Z_1-Z_2)^\dagger R^{-1}(Z_1-Z_2)\}}}{|R|^{2n_{cyc}} \pi^{2n_{cyc} n_r}}.$$

The maximum-likelihood total covariance matrix estimator is given by $$\hat{R} = \frac{(Z_1 - Z_2)(Z_1 - Z_2)^\dagger}{2n_{cyc}}.$$

The probability density for $Z_1$ and $Z_2$ under the assumption of absence of synchronization is given by $$p(Z_1, Z_2 \mid Q) = \frac{e^{-tr\{Z_1^\dagger Q^{-1} Z_1\} - tr\{Z_2^\dagger Q^{-1} Z_2\}}}{|Q|^{2n_{cyc}} \pi^{2n_{cyc} n_r}},$$

where Q is the noise-plus-interference covariance matrix during the two intervals. The maximum-likelihood total covariance matrix estimator is given by $$\hat{Q} = \frac{Z_1 Z_1^\dagger + Z_2 Z_2^\dagger}{2n_{cyc}}.$$

Consequently, the GLRT is given by the ratio of probability densities $$\varphi_{cyc,glrt}(\tau) = \frac{p(Z_1, Z_2 \mid \hat{X}, \hat{R})}{p(Z_1, Z_2 \mid \hat{Q})}$$

$$= \left| (Z_1 Z_1^\dagger + Z_2 Z_2^\dagger)^{-1} (Z_1 - Z_2)(Z_1 - Z_2)^\dagger \right|^{-2n_{cyc}}.$$

Wideband Cyclic Prefix GLRT

The wideband cyclic prefix GLRT formulation is formed by extending the narrowband formulation. The data samples $\tilde{Z}_1 \in \mathbb{C}^{(n_d \cdot n_r) \times n_{cyc}}$ and $\tilde{Z}_2 \in \mathbb{C}^{(n_d \cdot n_r) \times n_{cyc}}$ are generated by including delayed versions of $Z_1$ and $Z_2$ respectively. Thus, the GLRT is found by replacing $\bar{Z}_k$ with $\tilde{Z}_k$ in the equation above for $\phi_{cyc,glrt}(\tau)$ i.e., $$\phi_{cyc,wb\_glrt}(\tau) = |+\tilde{Z}_1\tilde{Z}_1^\dagger + \tilde{Z}_2\tilde{Z}_2^\dagger|^{-1}(\tilde{Z}_1-\tilde{Z}_2)(\tilde{Z}_1-\tilde{Z}_2)^{554}|^{-2n_{cyc}}$$

Wideband Interference: Frequency Domain Model

In certain embodiments of the invention, synchronization detection is provided in the frequency domain, e.g., using GLRT; that is, the synchronizer 555b is positioned after the FFT 556 as in FIG. 5B. Other synchronization statistics may be used as well for detection in the frequency domain. The model used is consistent with many implementations of MIMO OFDM systems. This approach exploits the fact that in the frequency domain, delays map conveniently to exponentials, $$f(t) \leftrightarrow F(\omega)$$

$$f(t-\tau) \leftrightarrow e^{i\omega\tau} F(\omega),$$

where $f(t)$ and $F(\omega)$ indicate the time-domain and the angular frequency domain representation of some function.

It is common in OFDM systems to periodically populate the OFDM symbol with a number of known values in the frequency domain. These pilot "tones" occupy a small fraction of the total number of frequency bins. They are used for channel estimation. In MIMO systems, a sequence of OFDM symbols is employed with independent modulation of the pilot signals emitted from each transmitter. Here the pilot sequences are used for a second purpose, synchronization.

Because this approach for synchronization operates in the frequency domain (after the Fourier transform), it is relatively insensitive to the exact timing offset. This relative insensitivity to the exact timing offset suggests a two-stage synchronization. First, the following GLRT detection approach is used to periodically determine if the synchronization signal is present. This detection may be done relatively coarsely, saving computations. Second, a fine search is used to more precisely estimate the delay offset.

1. Detection (e.g., using GLRT)

The number of pilot frequency bins is denoted $n_f$. For notational simplicity, here subscript f indicates a pilot index. Otherwise, f indicates the frequency of the indexed pilot. The number of OFDM symbols used is $n_s$. The received signal for the $f^{th}$ pilot frequency is given by $$Z_f = e^{i2\pi f\tau} H_f S_f + N_f \in C^{n_r \times n_s}.$$

This model incorporates multiple receiving antennas, since the received signal is indexed by receiving antenna along one dimension.

The probability density under the assumption of synchronization for a single frequency bin and a set of bins is given by $$p(Z_f \mid H_f, R_f) = \frac{e^{-tr\{(Z_f - e^{i2\pi f\tau}H_f S_f)^\dagger R_f^{-1}(Z_f - e^{i2\pi f\tau}H_f S_f)\}}}{|R_f|^{n_s}\pi^{n_r n_s}},$$

and $$p(Z \mid H, R) = \prod_f p(Z_f \mid H_f, R_f),$$

respectively. Here it is assumed that the interference-plus-noise covariance matrix is independent between pilot frequency bins, $$(R)_{f,f} = R_f,$$

and zero otherwise, where, here, R indicates the covariance matrix across space and frequencies. Similarly, here Z and H include the received signal and channel across space and pilot frequencies.

The maximum-likelihood channel estimate is given by taking the derivative with respect to some parameter, $\alpha_f$, of $H_f$:

$$\frac{\partial}{\partial \alpha_f} \log p(Z \mid H, R) = \frac{\partial}{\partial \alpha_f} \log \prod_g p(Z_g \mid H_g, R_g)$$

$$= 0$$

$$= \frac{\partial}{\partial \alpha_f} \log p(Z_f \mid H_f, R_f).$$

Solving for $H_f$ gives $$\hat{H}_f = e^{-2\pi i f\tau} Z_f S_f^\dagger (S_f S_f^\dagger)^{-1}.$$

By setting the derivative of the probability density with respect to the parameter $\beta_f$ of $R_f$ the maximum-likelihood estimator is found:

$$\frac{\partial}{\partial \beta_f} \log p(Z \mid \hat{H}, R) = \frac{\partial}{\partial \beta_f} \log \prod_g p(Z_g \mid \hat{H}_g, R_g)$$

$$= \frac{\partial}{\partial \beta_f} \log p(Z_f \mid \hat{H}_f, R_f)$$

$$= 0$$

$$\hat{R}_f = \frac{Z_f P_{S_f}^\perp Z_f^\dagger}{n_s}$$

where $P_{S_f}^\perp \equiv I_{n_s} - S_f^\dagger (S_f S_f^\dagger)^{-1} S_f.$

Using these estimators, the log likelihood is given by $$\log p(Z_f \mid \hat{H}_f, \hat{R}_f) = -tr\{n_s I_{n_r}\} - \log\left(\left|\frac{Z_f P_{S_f}^\perp Z_f^\dagger}{n_s}\right|^{n_s} \pi^{n_r n_s}\right).$$

Similarly, the probability density under the assumption of the absence of synchronization for a single frequency bin and a set of bins is given by $$p(Z_f \mid Q_f) = \frac{e^{-tr\{Z_f^\dagger Q_f^{-1} Z_f\}}}{|Q_f|^{n_s} \pi^{n_r n_s}},$$

and $$p(Z \mid Q) = \prod_f p(Z_f \mid Q_f),$$

respectively. The log likelihood under this assumption is given by $$\log p(Z_f \mid \hat{Q}_f) = -tr\{n_s I_{n_r}\} - \log\left(\left|\frac{Z_f Z_f^\dagger}{n_s}\right|^{n_s} \pi^{n_r n_s}\right).$$

Consequently, the frequency-domain GLRT is given by $$\varphi_{fd,glrt} = \frac{p(Z|\hat{Q})}{p(Z|\hat{H},\hat{R})}$$

$$= \prod_f \frac{|Z_f Z_f^\dagger|^{n_s}}{|Z_f P_{S_f}^\perp Z_f^\dagger|^{n_s}}$$

$$= \prod_f |I - P_{Z_f} P_{S_f}|^{-n_s}$$

where $P_{Z_f} \equiv Z_f^\dagger (Z_f Z_f^\dagger)^{-1} Z_f$.

2. Fine Timing Estimation

Once a coarse timing has been found, one of several techniques may be used to more precisely estimate timing. In one embodiment, the statistic presented above for frequency-domain GLRT (or other synchronization statistics) is calculated for every timing offset over a small time period. In another embodiment, a maximum-likelihood delay estimator is used. One such estimator is based on the frequency-domain model of the data under a narrowband channel assumption, $$Z_f = e^{2\pi i \tau f} H_0 S_f + N_f$$

It can then be shown that the maximum-likelihood estimate of the delay offset is, $$\hat{\tau} = \underset{\tau}{\mathrm{argmax}}$$
$$\sum_f -tr\{(Z_f - (Z_f - e^{i2\pi f\tau} \hat{H}_0 S_f)^\dagger \hat{R}_f^{-1} \cdot (Z_f - e^{i2\pi f\tau} \hat{H}_0 S_f)\} -$$
$$\log(|\hat{R}_f|^{n_s} \pi^{n_r n_s}),$$

where $\hat{H}_0$ is the estimate of the narrowband channel, and $\hat{R}_f$ is the estimate of the interference-plus-noise covariance in frequency bin f.

In the embodiment corresponding to the example of FIG. 5, the channel model includes multiple receiving antennas by virtue of the received data matrix accounting for multiple receiving antennas. The channel model includes an interference signal by virtue of the received data matrix including an additive term corresponding to a noise-plus interference matrix.

Embodiments or aspects of the invention may be implemented in hardware, firmware, or software. If implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. In a signal receiver of a wireless communication system, a method of processing a signal, the method comprising:

receiving the signal from a channel at multiple receiving antennas, the received signal having a resolvable delay spread with respect to each receiving antenna;

defining a data matrix of delay shifted versions of the received signal based on resolvable delay spread of a channel model, the channel model incorporating the multiple receiving antennas and the resolvable delay spreads of the received signal with respect to respective receiving antennas;

constructing a synchronization statistic incorporating the defined data matrix; and synchronizing the signal receiver to a signal transmitter based on the received signal and the synchronization statistic.

2. The method of claim 1 wherein the channel model further incorporates an interference signal transmitted by an interference transmitter.

3. The method of claim 2 wherein the channel model further incorporates multiple transmitting antennas that transmit respective signals to support multiple input multiple output (MIMO) communications.

4. The method of claim 3 wherein the interference signal in the channel model includes a second resolvable delay spread.

5. The method of claim 1 wherein the channel model further incorporates multiple transmitting antennas that transmit respective signals.

6. The method of claim 1 wherein the synchronization statistic is compared to a threshold.

7. The method of claim 1, wherein the synchronization statistic minimizes an error between a function of the received signal and the transmitted signal.

8. The method of claim 1, wherein the synchronization statistic is invariant to spatial and temporal transformations.

9. The method of claim 8, wherein the synchronization statistic is further based on a distance measure between a first subspace of the received signal and a second subspace of a reference signal.

10. The method of claim 9, wherein the distance measure corresponds to an arc length.

11. The method of claim 9, wherein the distance measure corresponds to a minimum angle.

12. The method of claim 9, wherein the distance measure corresponds to a chord length.

13. The method of claim 9, wherein the distance measure corresponds to a product of sine functions evaluated at respective principal angles between the first subspace and the second subspace.

14. The method of claim 1, wherein the synchronization statistic is further based on a generalized likelihood ratio comparing a first likelihood conditioned on a synchronization hypothesis with a second likelihood conditioned on a non-synchronization hypothesis.

15. The method of claim 1, wherein the synchronization statistic is determined periodically to provide a coarse synchronization, the method further including providing a fine synchronization following the coarse synchronization.

16. The method of claim 15 wherein the coarse and fine synchronizations each use a generalized likelihood ratio test (GLRT), each GLRT comparing a first likelihood conditioned on a synchronization hypothesis with a second likelihood conditioned on a nonsynchronization hypothesis.

17. The method of claim 1 performed successively until a synchronization is achieved.

18. The method of claim 1 wherein synchronizing provides temporal synchronization between the signal receiver and the signal transmitter.

19. The method of claim 18 wherein synchronization is performed in frequency domain.

20. The method of claim 1 further comprising demodulating the received signal.

21. The method of claim 1 wherein synchronizing is further based on a known component of the received signal.

22. In a signal receiver of a wireless orthogonal frequency-division multiplexing (OFDM) communication system, a method of processing an OFDM signal, the method comprising:

receiving the OFDM signal from a channel at multiple receiving antennas, the received OFDM signal having a resolvable delay with respect to each receiving antenna; and synchronizing the signal receiver to a signal transmitter based on a known component of the received OFDM signal and further based on a channel model incorporating the multiple receiving antennas and an interference signal including resolvable delay spreads with respect to respective receiving antennas.

23. The method of claim 22 wherein the known component is a cyclic prefix.

24. The method of claim 22 wherein the known component is a pilot sequence.

25. A communications apparatus comprising:
- a signal receiver to receive a signal from a channel at multiple receiving antennas, the received signal having a resolvable delay spread with respect to each receiving antenna;
- a data matrix of delay shifted versions of the received signal based on resolvable delay spread of a channel model, the channel model incorporating the multiple receiving antennas and the resolvable delay spreads of the received signal with respect to respective receiving antennas;
- a synchronization statistic incorporating the data matrix; and
- a synchronizer to synchronize the signal receiver to a signal transmitter based on the received signal and the synchronization statistic.

26. An orthogonal frequency-division multiplexing (OFDM) communications apparatus comprising:
- a signal receiver to receive an OFDM signal from a channel at multiple receiving antennas, the received OFDM signal having a resolvable delay spread with respect to each receiving antenna; and
- a synchronizer to synchronize the signal receiver to a signal transmitter based on a known component of the received OFDM signal and further based on a channel model incorporating the multiple receiving antennas and an interference signal including resolvable delay spreads with respect to respective receiving antennas.

* * * * *